United States Patent
Blanchard et al.

(10) Patent No.: US 12,307,481 B2
(45) Date of Patent: *May 20, 2025

(54) GUIDED ACCOUNT WARMING FOR ESTABLISHING SENDING REPUTATIONS

(71) Applicant: Klaviyo, Inc, Boston, MA (US)

(72) Inventors: Thomas Blanchard, Winchester, MA (US); Michael T. Lawson, Boston, MA (US); Christopher Schenker, Shrewbury, MA (US); Julian Zucker, Boston, MA (US); Francis Baker, Weymouth, MA (US)

(73) Assignee: Klaviyo, Inc, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,867

(22) Filed: May 26, 2024

(65) Prior Publication Data

US 2024/0311869 A1   Sep. 19, 2024

Related U.S. Application Data

(63) Continuation of application No. 18/225,135, filed on Jul. 23, 2023, now Pat. No. 12,026,742, which is a
(Continued)

(51) Int. Cl.
*G06Q 30/02* (2023.01)
*G06Q 30/0242* (2023.01)
(Continued)

(52) U.S. Cl.
CPC ......... *G06Q 30/0246* (2013.01); *H04L 51/42* (2022.05); *H04L 51/48* (2022.05)

(58) Field of Classification Search
CPC ..... G06Q 30/0246; H04L 51/42; H04L 51/48; H04L 51/52
See application file for complete search history.

(56) References Cited

U.S. PATENT DOCUMENTS

| | | |
|---|---|---|
| 8,117,267 B2 | 2/2012 | Gardner et al. |
| 8,224,905 B2 | 7/2012 | Bocharov et al. |
| (Continued) | | |

OTHER PUBLICATIONS

Iachello, G. et al. (2005). Control, Deception, and Communication: Evaluating the Deployment of a Location-Enhanced Messaging Service. In: Beigl, M., Intille, S., Rekimoto, J., Tokuda, H. (eds) UbiComp 2005: Ubiquitous Computing. UbiComp 2005. Lecture Notes in Computer Science, vol. 3660. (Year: 2005).*

*Primary Examiner* — Waseem Ashraf
*Assistant Examiner* — Christopher C Busch
(74) *Attorney, Agent, or Firm* — Brian R. Short (57) ABSTRACT

Apparatuses, methods, and systems for warming new accounts. One system includes a server electronically networked with a user and a plurality of recipients of an electronic mail campaign of the user, the server operating to obtain an initial contact list, check the initial contact list to determine that the initial contact list satisfies an initial set of engagement rules, generate an active contact list comprising modifying the initial contact list when the initial contact list does not satisfy the initial set of engagement rules, electronically send an electronic message campaign to the active contact list, analyze a success of the electronically sent campaign, and adaptively adjust the active contact list according to active engagement rules based on an evaluated success of the electronically sent campaign.

20 Claims, 5 Drawing Sheets

Related U.S. Application Data continuation of application No. 17/590,880, filed on Feb. 2, 2022, now Pat. No. 11,756,073.

(60) Provisional application No. 63/228,050, filed on Jul. 31, 2021.

(51) Int. Cl.
*H04L 51/42* (2022.01)
*H04L 51/48* (2022.01)

(56) References Cited

U.S. PATENT DOCUMENTS

| | | |
|---|---|---|
| 9,485,640 B2 | 11/2016 | Bowers et al. |
| 11,488,204 B2 * | 11/2022 | Pisupati ............. G06Q 30/0272 |
| 2002/0004745 A1 * | 1/2002 | Bascobert ............. G06Q 30/02 |
| | | 705/14.1 |
| 2006/0168024 A1 | 7/2006 | Mehr et al. |
| 2009/0037546 A1 | 2/2009 | Kirch |
| 2010/0049534 A1 | 2/2010 | Whitnah et al. |
| 2013/0080243 A1 | 3/2013 | Dias |
| 2021/0004422 A1 | 1/2021 | Sun et al. |

* cited by examiner

GUIDED ACCOUNT WARMING FOR ESTABLISHING SENDING REPUTATIONS

RELATED PATENT APPLICATIONS

This patent application is a continuation patent application of U.S. patent application Ser. No. 18/225,135 filed Jul. 23, 2023, which is a continuation patent application of U.S. patent application Ser. No. 17/590,880 filed Feb. 2, 2022, which claims priority to Provisional Patent Application Ser. No. 63/228,050 filed Jul. 31, 2021, which are herein incorporated by reference.

FIELD OF THE DESCRIBED EMBODIMENTS

The described embodiments relate generally to intelligent electronic message management. More particularly, the described embodiments relate to systems, methods and apparatuses for guided account warming for establishing sending reputation with inbox providers.

BACKGROUND

Merchants frequently send email campaigns to prospective customers to generate sales of products or services. However, sending the email campaigns to uninterested recipients can damage the reputation of the merchant, and make such email campaigns less effective.

It is desirable to have methods, apparatuses, and systems for guided account warming for establishing sending reputation with inbox providers.

SUMMARY

An embodiment includes a computer-implemented method of warming sending infrastructure for new electronic message marketing accounts. The method includes obtaining an initial contact list, checking the initial contact list to determine that the initial contact list satisfies an initial set of engagement rules, generating an active contact list comprising modifying the initial contact list when the initial contact list does not satisfy the initial set of engagement rules, electronically sending an electronic message campaign to recipients of the active contact list, analyzing a success of the electronically sent campaign, and adaptively adjusting the active contact list according to active engagement rules based on an evaluated success of the electronically sent campaign.

Another embodiment includes a system for warming new accounts. The system includes a server electronically networked with a user and a plurality of recipients of an electronic mail campaign of the user, the server operating to obtain an initial contact list, check the initial contact list to determine that the initial contact list satisfies an initial set of rules of engagement, generate an active contact list comprising modifying the initial contact list when the initial contact list does not satisfy the initial set of engagement rules, electronically send an electronic message campaign to recipients of the active contact list, analyze a success of the electronically sent campaign, and adaptively adjust the active contact list according to active engagement rules based on an evaluated success of the electronically sent campaign.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for guided account warming for establishing sending reputation with inbox providers. For an embodiment, the inbox providers are a merchant that provides a product or service. The inbox providers can be associated with one or more of different types of electronic messages. The different types of electronic messages can include one of more of email, text, SMS (Short Message Service), MMS (multimedia message), WhatsApp®, Push notifications, and/or Facebook Messenger®. For at least some embodiments, the sending reputation of the sending merchant is protected by analyzing characteristics of recipients of electronic message campaigns of the merchant. The analyzed characteristics provide for intelligent campaigns that send electronic messages to vetted recipients which are more likely to be interested and/or responsive to the electronic message campaign.

Figure 1:
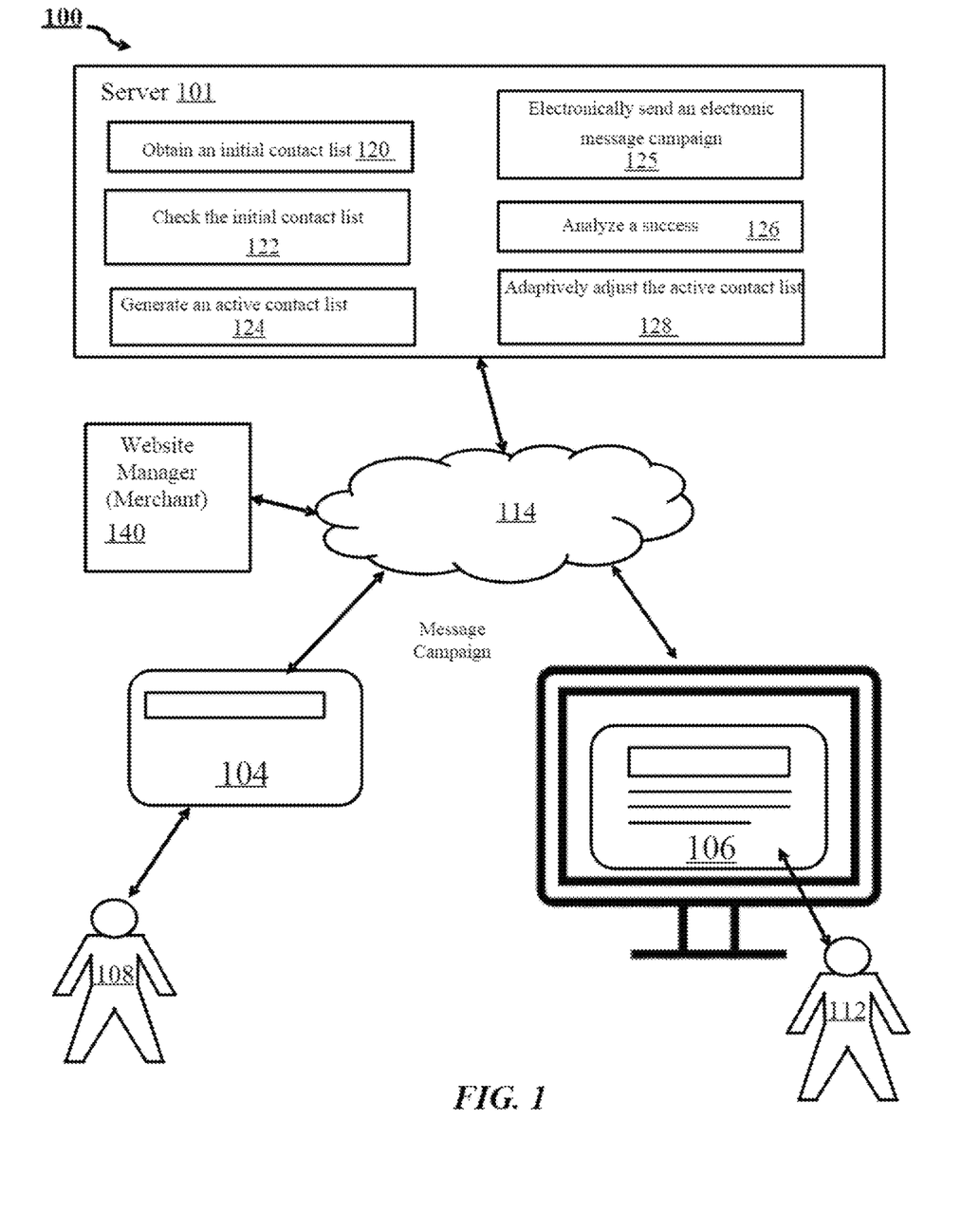
FIG. 1 shows a system for guided account warming for establishing sending reputation with inbox providers, according to an embodiment.

FIG. 1 shows a system 100 for guided account warming for establishing sending reputation with inbox providers (merchants), according to an embodiment. The system 100 includes a server 101. For an embodiment, the server 101 is electronically connected through a network 114 to electronic devices 104, 106 of site visitors 108, 112.

For an embodiment, the server 101 operates to warm electronic message accounts of a merchant. For an embodiment, the server 101 obtains an initial contact list that includes an initial number of electronic message contacts. Further, for an embodiment, the server 101 checks the initial contact list to determine that the initial contact list satisfies an initial set of engagement rules.

Currently, it is extremely easy for a merchant to start off on an email (or other type of electronic message) campaign with one of the most deliverability-harming actions a merchant can take. That is, the merchant pulls in a list of dubious quality contacts and blasts an email campaign to that entire list. Many of the recipients of the email campaign most likely will not happily receive the email campaign, and the merchant's reputation is hurt. Future email campaigns will not be as credible due to the degradation of the merchant's reputation.

For an embodiment, an initial set of engagement rules may include a volume warning. This feature gives a warning when a merchant is going to send an email campaign to a large volume of recipients that is likely to be damaging to a sender reputation of the merchant. For an embodiment, whenever the merchant wants to send an email campaign over a recommended volume, a warning to the merchant appears. That is, the server 101 automatically sends a warning to the merchant when the recommended volume is exceeded. However, this feature has a couple of issues. First, the warning is based entirely on the volume of email recipients, not engagement of the recipients, so not receiving the warning does not mean a user is following best practices for warming. Second, and more importantly, the merchant may not act on the warning, continuing to send emails beyond the recommended volume at nearly the same rate whether the merchant received the warning or not.

Historically, human on-boarders have been used for screening and guiding merchants to send email campaigns to safer audiences. However, using human on-boarders is time intensive. While warming is not a completely solved problem, it is clear that capturing even a portion of on-boarder-driven value for self-serve is valuable. However, on-boarders cannot track or sense actions by the recipients of the email campaign, and accordingly cannot adapt the email campaign based on tracked or sensed actions of the recipients.

For an embodiment, the server 101 operates to generate an active contact list that includes modifying the initial contact list when the initial contact list does not satisfy the initial set of engagement rules. Note that, for an embodiment, the active contact list will be the initial contact list if the initial contact list satisfies the initial set of engagement rules.

For an embodiment, the server 101 operating to check the initial contact list to determine that the initial contact list satisfies the initial set of engagement rules includes the server 101 operating to determine whether a number of recipients of the initial contact list is greater than a first contact number threshold and may be harmful to a brand of a user (merchant) of the new email marketing accounts. For an embodiment, the server 101 further operates to generate the active contact list by modifying the initial contact list by reducing the number of recipients to below the first contact threshold. For an embodiment, alerts can be provided to the merchant to approve/disapprove the modification to the initial contact list.

For an embodiment, the server 101 operating to check the initial contact list to determine that the initial contact list satisfies the initial set of engagement rules includes the server 101 operating to identify a number of unengaged recipients of the initial contact list. Further, the server 101 operates to compare the number of recipients of the initial contact list with a number of recipients of the of initial contact list minus the unengaged recipients. That is, a new list is generated by removing the unengaged recipients from the initial contact list. A contact list that includes a higher percentage of engaged recipients will be more successful.

For an embodiment, in the context of determining engaged recipient for the purpose of determining whether the initial contact list satisfies the initial engagement rules, the engagement determination is made based on prior electronic message campaigns of the same merchant as the present electronic message campaign. That is, the merchant of the present campaign has either previously sent out the same or a similar electronic message campaign, or the merchant has previously sent out a different campaign.

Engaged Recipients

For an embodiment, an engaged recipient is a recipient of one or more prior electronic message campaigns that takes an action that qualifies the recipient as engaged. For an embodiment, the one or more prior electronic message campaigns are campaigns of a merchant of a present campaign. A recipient that does not qualify as an engaged recipient is identified as an unengaged recipient. Different and adaptive qualifications can be utilized in the determination of whether an electronic message campaign recipient qualifies as an engaged recipient.

For an embodiment, an engaged recipient is a recipient that takes an action in response to receiving one or more of the prior electronic message campaigns. For an embodiment, the recipient opening the electronic message of the prior electronic message campaign qualifies as an action. For an embodiment, the recipient selecting a link included within the prior electronic message campaign qualifies as an action. For an embodiment, the recipient completing a purchase of a product or service based on the prior electronic message campaign qualifies as an action. For an embodiment, web browsing of the recipient is tracked, and the recipient performing specific web activity qualifies as an action. For an embodiment, the recipient is associated with a mobile device that includes location and/or motion detection capabilities, and the recipient performing specific motions or visiting specific locations qualifies as an action.

An embodiment includes defining or identifying different periods of time, wherein qualification of whether a recipient is an engaged recipient is different for different of the identified or predetermined periods of time. Different actions performed by a recipient after receiving the electronic message campaign can demonstrate different levels of engagement by the recipient. For example, a recipient opening an electronic message of the campaign may depict a lower level of engagement than a recipient that selects a link included within the message. An embodiment includes lower levels of engagement actions being required to have occurred more recently than high levels of engagement actions. For example, a recipient opening an electronic message of the campaign may be required to have occurred more recently than a recipient selecting a link within the electronic message because the link selection shows a higher level of engagement than accessing the electronic message. As will be described, different levels of engagement can be given different engagement scores. One or more of the scores can be summed. If the total of the one or more summed engagements exceeds an engagement score, then the recipient is determined to be engaged.

An embodiment includes adjusting the action of a recipient required to be designated as an engagement based on an amount of time after the recipient receives the electronic message campaign. An embodiment includes ranking actions of the recipient, wherein the ranking reflects a level of engagement by the recipient. For example, the recipient opening the campaign may result in a first (lower) ranking. The recipient selecting a link within the campaign may result in a second (higher than the first ranking) ranking. The recipient taking an action to purchase a service or product of the campaign may result in a third (higher than the first or second rankings) ranking. The recipient physically going to a physical location after receiving the campaign may result in a fourth (higher than the first, second, or third rankings) ranking. As time elapses after the campaign has been sent, for an embodiment, an action qualifying as engagement changes over time. That is, the longer after the campaign has been sent, the higher the ranking of the action required to qualify as an engagement.

For an embodiment, a weighted combination of actions by the recipient is required for qualifying as an engagement. That is, a threshold score of action of the recipient may be required to qualify as an engagement, wherein each action of the recipient has a weighted sub-score. The weighted sub-scores of multiple actions by the recipient are summed. If the summation of the weighted sub-scored exceeds the threshold score, then the multiple actions by the recipient qualify as an engagement.

For an embodiment, the weighted sub-score of each action decays after time. That is, as time passed after sending the campaign, the sub-score weight of each of the plurality of actions decays or is reduced.

For an embodiment, the sub-score weight for each action can be adaptively adjusted based on which action occurred prior to a present action. That is, the pattern of the sequence of actions can provide an indication of the level of engagement of the recipient. For example, a prior action of a recipient purchasing a pogo stick can make an action of opening a message of a campaign directed to helmets score higher. Therefore, tracking behaviors of recipients both before and after the sending of the (prior) campaign can influence what actions by the recipient qualify as an engagement.

For an embodiment, the server 101 operating to generate the active contact list includes the server 101 operating to eliminating the unengaged recipients if the compared number of recipients of the initial contact list with a number of recipients of the of initial contact list minus the unengaged recipients is greater than a threshold percentage. For example, if the number of total recipients is 20% greater than the number of total recipients minus the unengaged recipients, then the unengaged recipients are eliminated. The idea is to make sure that less than a certain percentage of the total recipients of the electronic message campaign are unengaged recipients, or that greater than a certain percentage of the total recipients of the electronic message campaign are engaged recipients. The greater the number of engaged recipients, the better the results of the campaign.

For example, if a merchant is looking to send out a campaign, an initial contact list may include 100,000 potential recipients of the present campaign. For an embodiment, a volume threshold is checked. For example, an initial volume threshold may be 1000. Since 100,000 is greater than 1000, the initial list may be determined to be potentially harmful to the sender's (merchant's) reputation. The initial contact list is then compared to what the list would be if unengaged recipients are removed from the list. If, for example, 20,000 are determined to be unengaged, then the initial number of 100,000 is compared to the list if the unengaged are removed (80,000). If the result differs by greater than a predetermined amount (say 20%), then the unengaged recipients are removed from the list.

For example, a merchant may upload a contact list of 100,000 recipients. The server 101 may perform a guided warming of an electronic message campaign by determining which of the recipients of the contact list have been unengaged (for example, recipients that have not opened or clicked an electronic message of the merchant in the last 30 days). If, for example, there are 50,000 who have not engaged with an electronic message campaign of the merchant, and the volume cap is 30,000, then the total number of recipients can be reduced by identifying potential recipients that have been unengaged for 15 days (a shorter time period or time sample for determining engagement). If, for example, the 15 day period results in 80,000 recipients and 20,000 engaged which results in a lower number of unengaged recipients.

For an embodiment, after generation of the active contact list, the server 101 automatically sends the electronic message campaign to the recipients of the active contact list. For an embodiment, the server 101 further operates to analyze a success of the electronically sent campaign. Further, for an embodiment, the server 101 further operates to adaptively adjust the active contact list according to active engagement rules based on an evaluated success of the electronically sent campaign.

Analyzing Success of Electronically Sent Campaign

For an embodiment, analyzing the success of the campaign includes determining an open rate of the electronic messages of the campaign. For an embodiment, determining the open rate includes determining a percentage of recipients that opened the campaign. That is, the electronic message campaign is electronically sent to the recipients of the active contact list. The success of the electronic message campaign can be gauged or determined based on a percentage of the recipients that receive the electronic message campaign that opens or accesses the message. Not opening the message can indicate a complete lack of interest by the recipient. Opening the message can include at least some interest in the electronic message campaign. Therefore, determining an open rate of the recipients that received the electronic message campaign provides an indication of a level of success of the campaign.

For an embodiment, analyzing the success of the campaign includes determining a click through rate of the campaign, including determining a percentage of recipients that selected a link within the campaign. Whether a recipient performs an action based on the campaign can provide an indication of the success of the campaign. For an embodiment, the campaign includes a message to the recipients that includes a link that when accessed sends the recipient to a desired web location. This indicates that the recipient accessed the campaign and performed an action of accessing a link within the campaign. These actions show interest by the recipient and provide an indication of the success of the campaign.

For an embodiment, analyzing the success of the campaign includes determining a conversion rate of the campaign, including determining a percentage of recipients that are determined to have performed an action (purchase) based on the campaign. If a recipient performs an action, such as, a purchase of a product or service based on the campaign, then the recipient has accessed (opened message) and performed an action that includes a purchase. These activities by the recipient demonstrate a success of the campaign. Determining the percentage of recipients that complete a purchase provides a relative level of success of the campaign.

For an embodiment, analyzing the success of the campaign includes determining other actions of the recipients after having received the campaign. Action performed by the recipient may include, for example, the recipient visiting a physical location, or some other change of behavior, such as, making a reservation at a restaurant, subscribing to a mailing list, reading an article, visiting a website, or posting on social media.

For an embodiment, web activity of the recipients is tracked. Web activity of the recipient after the recipient receives the campaign can provide indications of the success of the campaign. As suggested, web activity such as making a reservation at a restaurant, subscribing to a mailing list, reading an article, visiting a website, or posting on social media can be used as indicators of the success of the campaign.

For an embodiment, motion and/or physical locations visited by the recipients is tracked. This allows determinations of visiting a physical location. Further, sensed motion of the recipient can be useful. As described, for an embodiment, one or more of the recipients are associated with a mobile device. An application on the mobile device can utilize sensors within the mobile device to sense location and/or motion of the recipient. The sensed location of the user can be used to determine that the recipient visited a location of the merchant after receiving the electronic message campaign from the merchant. Further, motion sensors can be used to determine, for example, that the recipient physically picked up a product of the merchant, how long the recipient held the product, and how long the recipient looked at the product. All of these sensed location and motion factors can be used to determine the success of the electronic message campaign.

For an embodiment, a weighted combination of actions by the recipients is used to gauge the success of the campaign. That is, some actions provide a greater indication of the success of the campaign. The level of success of the campaign can be gauged based on a weighted combination of actions in which some actions are given a greater weight. Further, the weight of a particular action can adaptively change based on the occurrence of a prior action. For example, the action of physically visiting a location of a merchant by recipient may be given a greater weight if the recipient previously performed a web search of a product of the merchant as a result of receiving the electronic message campaign from the merchant.

For an embodiment, actions of a recipient of the electronic message are weighted differently depending on the type of electronic message that the recipient received the electronic campaign. For example, for an embodiment, opening an electronic message of an campaign through a SMS (Short Message Service) is given a lower weight than opening an electronic message of the campaign through electronic message. Generally, everyone opens an SMS message, whereas recipients tend to scrutinize an electronic message more carefully. Possible electronic messaging types include, for example, email, text, SMS (Short Message Service), MMS (multimedia message), WhatsApp®, Push notifications, and Facebook Messenger®.

Adaptively Adjusting the Active Contact List

As previously stated, for an embodiment, the active engagement rules include identifying engaged or active recipients of the electronic message campaign of the active contact list over a predetermined period of time. For an embodiment, the active contact list being adaptively adjusted based on an evaluated success of the electronically sent campaign includes adjusting the predetermined period of time based on the evaluated success of the electronically sent campaign. For an embodiment, the period of time increases when the evaluated success indicates the electronically sent campaign is determined to be successful, and wherein the period of time decreases when the evaluated success indicates the electronically sent campaign is determined to be unsuccessful. For an embodiment, the predetermined period of time is adaptively increased based on the relative success of the campaign, and the predetermined period of time is adaptively decreased based on the relative lack of success of the campaign. The more successful a campaign is, the greater the predetermined period of time, and therefore, most likely an increase in the number of recipients. The less successful the campaign, the less the predetermined period of time, and therefore, more likely a decrease in the number of recipients.

For an embodiment, threshold levels of engagement action of the recipient can be adjusted based on the success of the electronic message campaign. For example, if a campaign is being determine as very successful, the threshold level of engagement determination can be adaptively adjusted to a lower level. Further, the time period for engagement can be increased the greater the level of determine success of the electronic message campaign.

For an embodiment, the active contact list adaptively updates as frequently as every time the electronic message campaign is electronically sent. For an embodiment, the predetermined period of times adaptively updates as frequently as every time the electronic message campaign is electronically sent.

A website manager 140 operates and manages an ecommerce website of, for example, a merchant. For an embodiment, the website manager 140 includes a server of a business that operates to directly control the ecommerce website. For an embodiment, the website manager 140 includes a combination of the business and a third party to operate to control the ecommerce website. For an embodiment, the website manager 140 is a customer of the operator of the server 101. For an embodiment, the website manager 140 is a combination of the customer of the operator of the server 101 and a third party (such as, a Shopify platform).

Figure 2:
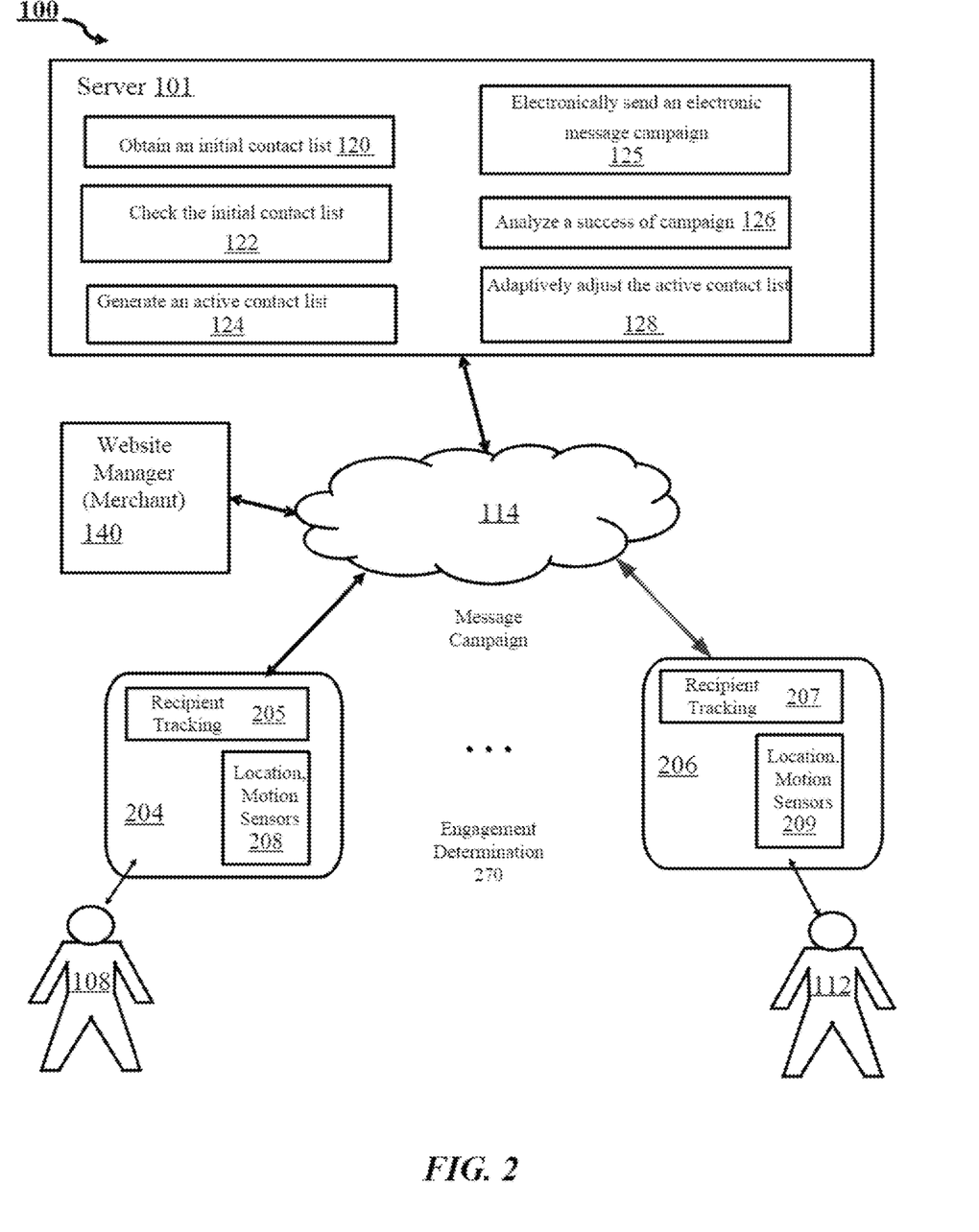
FIG. 2 shows another system for guided account warming for establishing sending reputation with inbox providers, according to another embodiment.

FIG. 2 shows another system for guided account warming for establishing sending reputation with inbox providers, according to another embodiment. For this embodiment, one or more of the recipients are associated with a mobile device. Accordingly, actions and physical locations of the recipients can be tracked. For at least some embodiments, the tracking of motions and/or locations of the recipients are used for determining whether the recipients are engaged.

As shown, recipients 108, 112 operate mobile devices 204, 206. For an embodiment, the mobile device includes location and/or motion detection devices. The location monitoring device may include a GNSS (global network satellite system), such as, GPS (global positioning system). Further the motion detection devices of the mobile devices 204, 206 may include accelerometers, gyroscopes, and/or magnetic sensors.

For an embodiment, the location monitoring of the mobile device of the recipient is used to identify business locations visited by the recipient after receiving the campaign. Different businesses can be rated, wherein particular businesses yield a higher engagement score, and other particular businesses yield a lower engagement score. The engagement score of each business can be adaptively adjusted based on the campaign and can be adjusted based on other businesses visited by the recipient. For an embodiment, patterns of location visits by the recipient can be used to influence the level of engagement.

For an embodiment, motion of the recipient is tracked, and can be used to influence the level of engagement. Certain actions (motions) of the recipient may indicate different levels of engagement. For an embodiment, the computing devices 204, 206 may include a mobile phone, a smart watch, or a headset. Motion of the recipient can include tracking hand motions, direction of eyesight, and/or orientations of the recipient. Accordingly, whether the recipient is in a physical location of a product of the merchant can be determined. Further, how long the recipient holds or looks at a specific product of the merchant can be determined. Further, whether the recipient interacts with another recipient can be determined. All the sensed/tracked locations and motions of the recipient can be included within a success score of the electronic message campaign.

Further, for an embodiment, different businesses physically visited can be rated, wherein particular businesses yield a higher success score and other particular businesses yield a lower success score. The success score of each business can be adaptively adjusted based on the campaign and can be adjusted based on other businesses visited by the recipient. For an embodiment, patterns of location visits by the recipient can be used to influence the level of success. That is, for example, visiting a location of a business can be rated higher or lower based on a previous business visited by the recipient.

As previously described, the recipient tracking can include monitoring of web browsing of the recipient. Online action and activity of the recipient can influence the success score. Links accessed by the recipient can be tracked. Websites visited by the recipient can be tracked. Online purchases of the recipient can be tracked. Each of the online web browsing of the recipient can influence the success score of the electronic message campaign.

For an embodiment, relationships between different recipients are determined. For example, web tracking can determine online relationships between recipients. Further, for an embodiment, a real physical relationship between recipients can be established by tracking the locations of the different recipients. Two recipients may be identified as living together based on location tracking. Further, commonalities of recipients can be determined by identifying common locations, or common types of locations between the different recipients.

For an embodiment, a level of engagement or a level of success can be adaptively adjusted for each recipient based on actions of an associated recipient. An action by a related or common type of recipient can influence how much an action by a recipient influences the engagement determination or influences a success determination.

Figure 3:
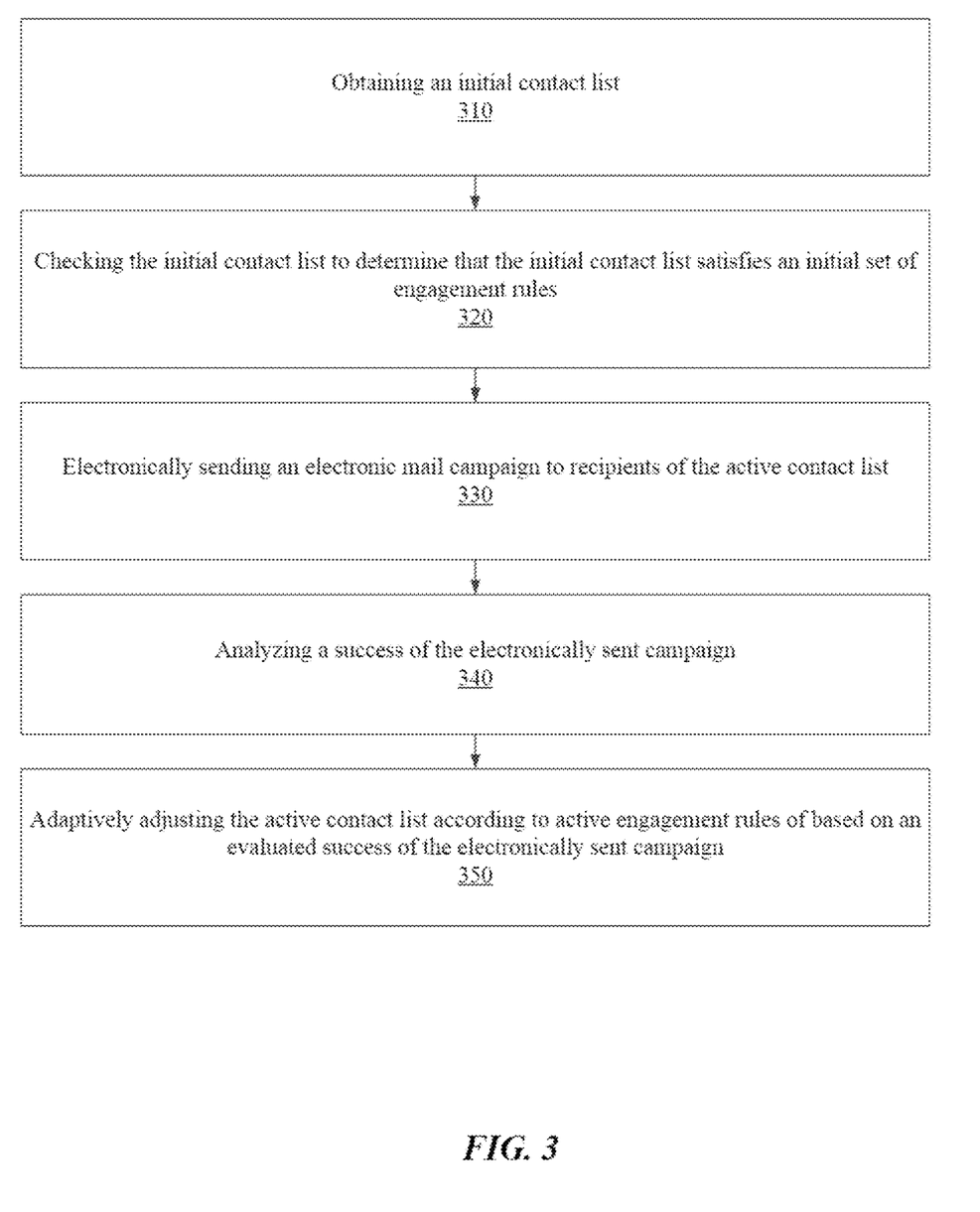
FIG. 3 is a flow chart that includes steps of a method for guided account warming for establishing sending reputation with inbox providers, according to an embodiment.

FIG. 3 is a flow chart that includes steps of a method for guided account warming for establishing sending reputation with inbox providers, according to an embodiment. A first step 310 includes obtaining an initial contact list (that includes an initial number of electronic message contacts). A second step 320 includes checking the initial contact list to determine that the initial contact list satisfies an initial set of engagement rules. A third step 310 includes generating an active contact list comprising modifying the initial contact list when the initial contact list does not satisfy the initial set of engagement rules; (Note that, for an embodiment, the active contact list will be the initial contact list if the initial contact list satisfies the initial rules of engagement). A fourth step 340 includes electronically sending an electronic message campaign to the active contact list. A fifth step 350 includes analyzing a success of the electronically sent campaign. A sixth step 360 includes adaptively adjusting the active contact list according to active engagement rules based on an evaluated success of the electronically sent campaign.

For an embodiment, the engagement rules and evaluated success of the campaign is adjusted based on an industry of the merchant. For example, the engagement rules can be adapted based on company size, or a catalog size of the merchant.

For an embodiment, the active engagement rules include identifying engaged recipients of the electronic message campaign of the active contact list over a predetermined period of time. For an embodiment, multiple actions by the recipient are needed to qualify as an engagement. For an embodiment, a frequency of engagement is further included. That is, the frequency of engagement over the predetermined period of time. This can be reflected in the definition of engaged recipient. That is, an engaged recipient is defined as one or more actions performed by the recipient.

For an embodiment, and engagement or success determination includes a number of engagements over the period of time. That is, recipients who have opened an electronic message in the last 30 days or opened 2 electronic messages in the last 90 days qualify as an engagement. For at least some embodiment, actions of a recipient that qualify as an engagement include the recipient visiting a website over some period of time, signing up for a list over some period of time, making a purchase, visiting a physical location (e.g. store location), and/or interacted with a product or a phone application (for example, a Fitbit®).

An embodiment includes a plurality of predetermined periods of time, wherein qualification of whether a recipient is an engaged recipient is different for different of the predetermined periods of time. For example, a recipient opening an electronic message might show a lower level of engagement than a recipient clicking a link in an electronic message, so an electronic message may be required to be opened more recently than a click in order to qualify the recipient as engaged. For an embodiment, different actions have different associated weights. For an embodiment, the weights decay over time. For an embodiment, actions having greater weights decay over time at a different rate than actions having a lower weight. For an embodiment, multiple actions having different weights are summed, and an engagement is determined if the summation is greater than a selected threshold value. For an embodiment, one action occurring varies the weighting of a subsequent action. For example, a recipient buying a pogo stick can make the action of opening helmet emails by the recipient weighted more highly.

For an embodiment, adaptively adjusting active contact list according to active engagement rules based on an evaluated success of the electronically sent campaign includes adjusting the predetermined period of time based on the evaluated success of the electronically sent campaign. For an embodiment, the period of time increases when the evaluated success indicates the electronically sent campaign is determined to be successful, and wherein the period of time decreases when the evaluated success indicates the electronically sent campaign is determined to be unsuccessful. For an embodiment, the active contact list adaptively updates as frequently as every time the electronic message campaign is electronically sent. For an embodiment, the active contact list can alternatively be updated periodically independent of the electronic campaign being sent. For example, updated twice daily. For an embodiment, the predetermined period of time adaptively updates as frequently as every time the electronic message campaign is electronically sent.

For an embodiment, checking the initial contact list to determine that the initial contact list satisfies the initial set of rules of engagement includes determining whether a number of recipients of the initial contact list is greater than a first contact number threshold and may be harmful to a brand of a user of the new electronic message marketing accounts. For an embodiment, generating the active contact list comprises modifying the initial contact list by reducing the number of recipients to below the first contact threshold. For an embodiment, the number of recipients is reduced by using a smaller time sample of engaged recipients. For an embodiment, alerts can be provided to the user to approve/disapprove the modification to the initial contact list. For an embodiment, checking the initial contact list to determine that the initial contact list satisfies the initial set of rules of engagement includes identifying a number of unengaged recipients of the initial contact list, and comparing the number of recipients of the initial contact list with a number of recipients of the of initial contact list minus the unengaged recipients are removed from the initial contact list. For an embodiment, generating the active contact list includes eliminating the unengaged recipients if the compared number of recipients of the initial contact list with a number of recipients of the initial contact list minus the unengaged recipients is greater than a threshold percentage. For example, ensuring that no more than 20% of the recipients are unengaged.

For an embodiment, analyzing the success of the campaign comprises determining an open rate of the campaign, including determining a percentage of recipients that opened the campaign. For an embodiment, analyzing the success of the campaign comprises determining a click through rate of the campaign, including determining a percentage of recipients that selected a link within the campaign. For an embodiment, analyzing the success of the campaign comprises determining a conversion rate of the campaign, including determining a percentage of recipients that are determined to have performed an action (such as, a purchase) based on the campaign. For an embodiment, determining that recipients performed an action includes determining that the recipient visited a physical location, or some other change of behavior (such as, making a reservation at a restaurant, subscribing to a mailing list, reading an article, visiting a website, posting on social media). For an embodiment, determination of an action includes a summation of actions wherein each type of action includes a weighting. An action is determined if the weighted summation exceeds a predetermined threshold. For an embodiment, the weight of one action is influenced by the occurrence of another action.

Figure 4:
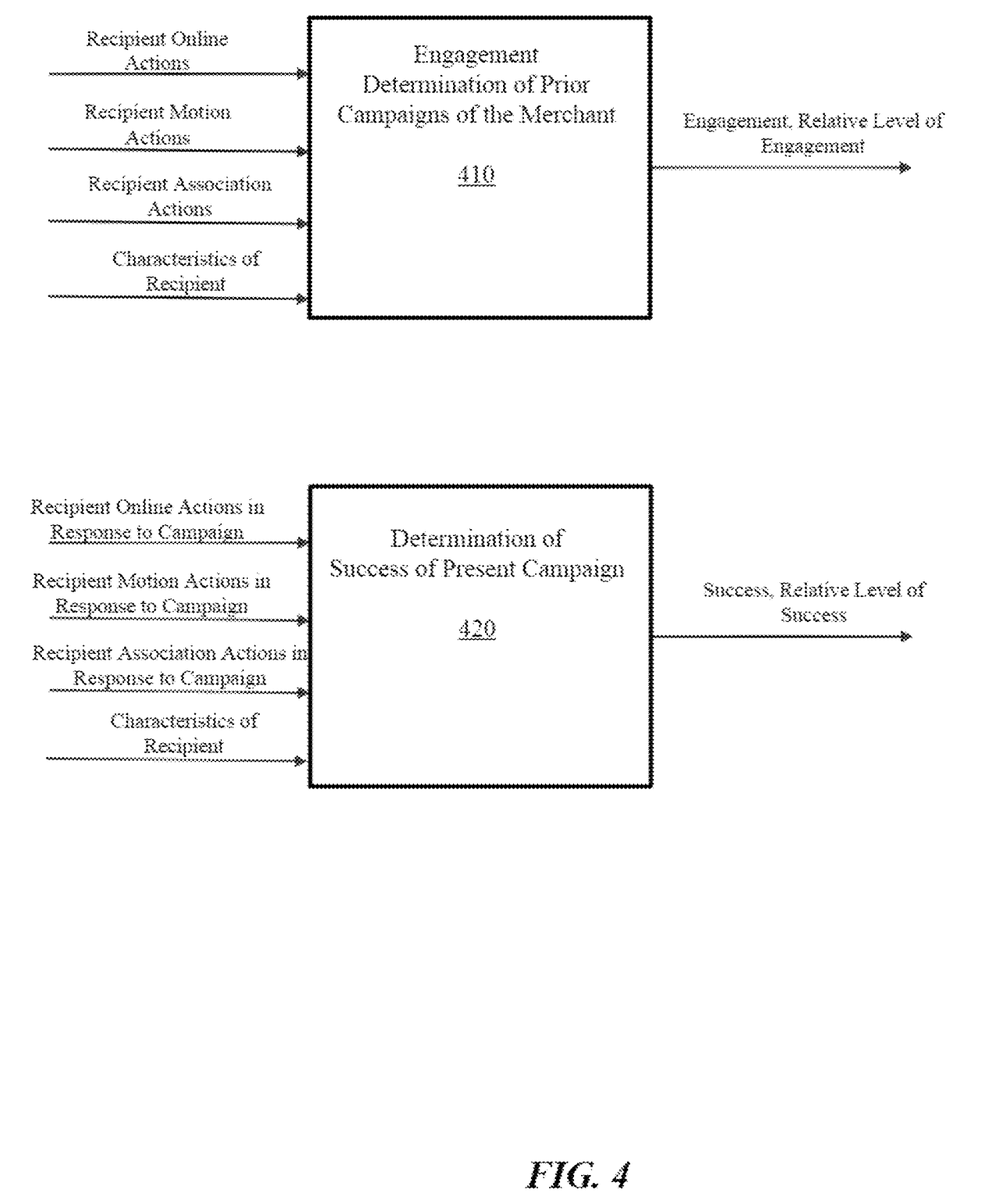
FIG. 4 shows an engagement determination engine, and a campaign success engine, according to an embodiment.

FIG. 4 shows an engagement determination engine 410, and a campaign success engine 420, according to an embodiment. It is to be understood that the engagement determination engine 410 and a campaign success engine 420 are figurative and illustrate processing that can occur at the server 101 (FIG. 1) and/or at the website manager 140.

For an embodiment, the engagement determination engine 410 is responsive to prior electronic message campaigns of the merchant. For an embodiment, the output of the engagement determination engine 410 includes an engagement or level of engagement of recipients of the prior electronic message campaigns of the merchant. For an embodiment, the engagement or level of engagement of recipients of the prior electronic message campaigns of the merchant is used to adjust an initial contact list after checking the initial contact list to determine that the initial contact list satisfies an initial set of engagement rules. That is, the initial contact list is adjusted to reduce the number of non-engaged recipients. For an embodiment, the level of engagement of the recipients of the prior electronic message campaigns of the merchant is used to adaptively adjust the number of recipients of the initial contact list.

For an embodiment, the engagement determination engine 410 receives recipient online actions that result response to receiving the prior electronic message campaigns of the merchant as an input. As previously described, the online action can include opening an electronic message of prior campaign, selecting links, web browsing, accessing social networks, visiting a website, purchasing a product online, or adding a product to online shopping cart etc. As previously described, the level of engagement of the recipient can be adaptively adjusted based on which online actions are performed. Further, the level of engagement of the recipient can be adjusted based on the order or sequence in which the actions are performed. For an embodiment, the levels of engagement are ranked with a score. One or more of the scores of the actions can be summed, and the summed amount exceeding a threshold indicates engagement by the recipient.

For an embodiment, the engagement determination engine 410 receives sensed motion and location actions that result in response to receiving the prior electronic message campaigns of the merchant as an input. As previously described, a computing device of one or more of the recipients can include motion and location sensors which sense the location and motions of the recipient(s). The sensing of the location of the recipient can provide an indication that the recipient visited a location of the merchant. Further, the sensed location of the recipient can indicate interactions with other recipients. The sensed motion of the recipients can indicate actions of the recipient, such as, picking up and viewing a product of the merchant.

For an embodiment, the engagement determination engine 410 receives recipient associations in response to receiving the prior electronic message campaigns of the merchant as an input. Further, the associations can be previously determined. For an embodiment, the associations are determined by online actions of the recipients. For an embodiment, the associations are determined by location and motion monitoring of the recipients. For an embodiment, determination of associations between recipients influences the level of engagement of other actions by the recipients. That is, a friend of a recipient performing an action can influence the level of engagement of the recipient performing an action. Further, the association between recipients can be established by recipients that demonstrate similar types of observed behavior.

For an embodiment, the engagement determination engine 410 receives recipient values as an input. That is, certain of the recipients can be perceived as "high value" recipients because of a determined influence that the certain recipients have on others. For example, it may be determined that a particular recipient has a large social media influence. Therefore, actions taken by the particular recipient can be given a higher ranking or score because of the possible influence the particular recipient may have on other recipients. The value of a recipient can be determined by correlating observed behavior of other recipients with behavior of the particular recipient. Further, the particular recipient may be given on online influence score that helps determine the value of the particular recipient.

For an embodiment, one or more or a weighted combination of the inputs to the engagement determination engine are used for determining a level of engagement of recipients, and whether each recipient is engaged or unengaged. As previously described, the engagement determination includes the weighted combination of inputs exceeding a predetermined selected threshold.

For an embodiment, the engagement determination engine 410 is responsive to the prior electronic message campaigns of the merchant. For an embodiment, the output of the engagement determination engine 410 includes an engagement or level of engagement of recipients of the prior electronic message campaigns of the merchant. For an embodiment, the engagement or level of engagement of recipients of the prior electronic message campaigns of the merchant is used to adjust an initial contact list after checking the initial contact list to determine that the initial contact list satisfies an initial set of engagement rules. That is, the initial contact list is adjusted to reduce the number of non-engaged recipients. For an embodiment, the level of engagement of the recipients of the prior electronic message campaigns of the merchant is used to adaptively adjust the number of recipients of the initial contact list.

For an embodiment, the present electronic message campaign success determination engine 420 receives recipient online actions that result response to receiving the present or current electronic message campaign of the merchant as an input. As previously described, the online action can include opening an electronic message of the campaign, selecting links, web browsing, accessing social networks, visiting a website, purchasing a product online, or adding a product to online shopping cart etc. As previously described, the level of engagement of the recipient and therefore the success of the present campaign can be adaptively adjusted based on which online actions are performed. Further, the level of engagement of the recipient can be adjusted based on the order or sequence in which the actions are performed. For an embodiment, the levels of engagement are ranked with a score. One or more of the scores of the actions can be summed, and the summed amount exceeding a threshold indicates engagement by the recipient.

For an embodiment, the present electronic message campaign success determination engine 420 receives sensed motion and location actions that result in response to receiving the present electronic message campaigns of the merchant as an input. As previously described, a computing device of one or more of the recipients can include motion and location sensors which sense the location and motions of the recipient(s). The sensing of the location of the recipient can provide an indication that the recipient visited a location of the merchant. Further, the sensed location of the recipient can indicate interactions with other recipients. The sensed motion of the recipients can indicate actions of the recipient, such as, picking up and viewing a product of the merchant.

For an embodiment, the present electronic message campaign success determination engine 420 receives recipient associations in response to receiving the present electronic message campaigns of the merchant as an input. Further, the associations can be previously determined. For an embodiment, the associations are determined by online actions of the recipients. For an embodiment, the associations are determined by location and motion monitoring of the recipients. For an embodiment, determination of associations between recipients influences the level of engagement of other actions by the recipients. That is, a friend of a recipient performing an action can influence the level of engagement of the recipient performing an action. Further, the association between recipients can be established by recipients that demonstrate similar types of observed behavior.

For an embodiment, the present electronic message campaign success determination engine 420 receives recipient values as an input. That is, certain of the recipients can be perceived as "high value" recipients because of a determined influence that the certain recipients have on others. For example, it may be determined that a particular recipient has a large social media influence. Therefore, actions taken by the particular recipient can be given a higher ranking or score because of the possible influence the particular recipient may have on other recipients. The value of a recipient can be determined by correlating observed behavior of other recipients with behavior of the particular recipient. Further, the particular recipient may be given on online influence score that helps determine the value of the particular recipient.

For an embodiment, one or more or a weighted combination of the inputs to the present electronic message campaign success determination engine 420 are used for determining a level of engagement of recipients, and whether each recipient is engaged or unengaged. As previously described, the success determination includes the weighted combination exceeding a preselected threshold.

Figure 5:
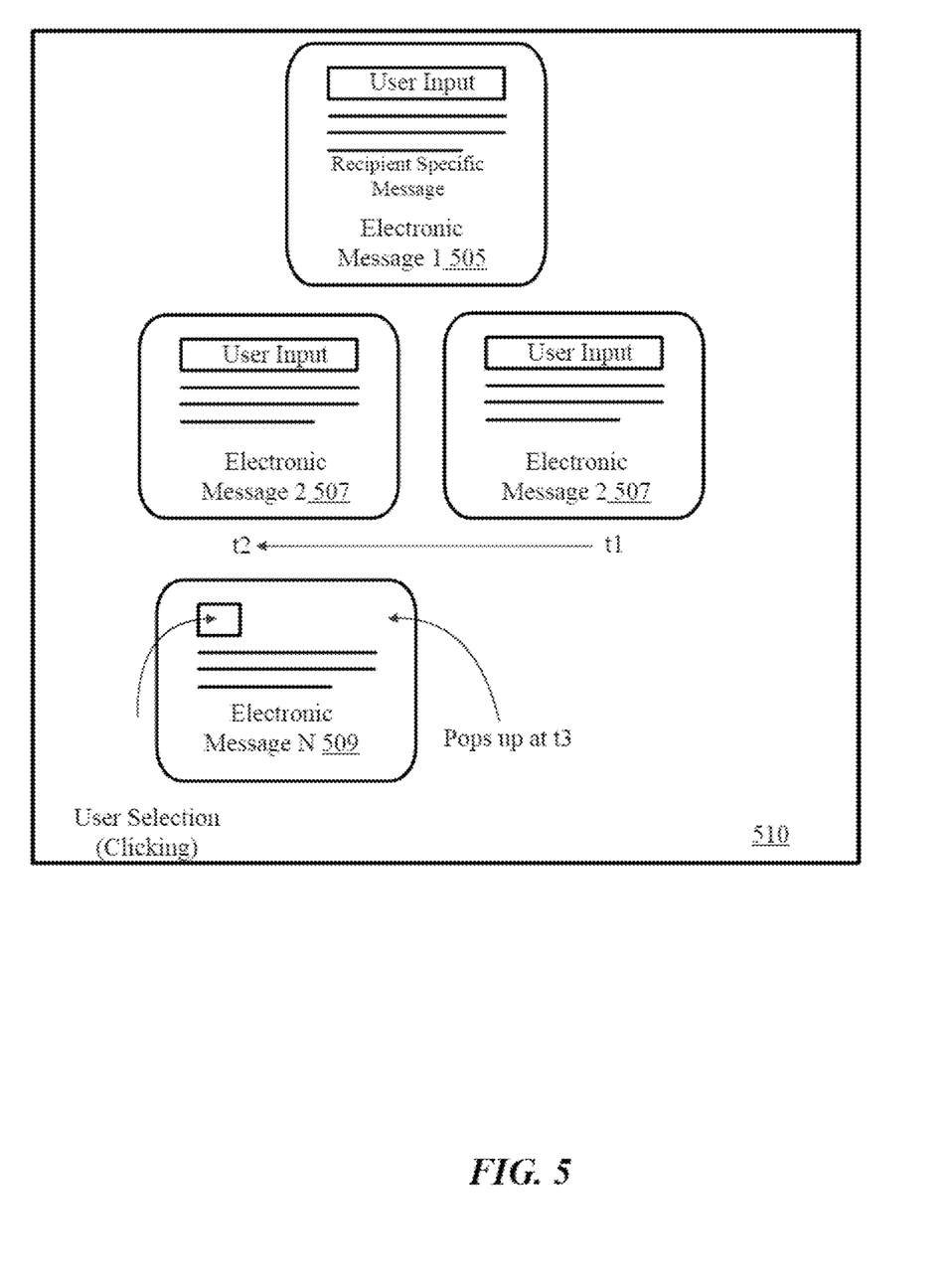
FIG. 5 shows displays of campaign recipients in which the display of each of the campaign recipients varies depending on characteristics of each of the campaign recipients, according to an embodiment.

FIG. 5 shows displays of campaign recipients in which the display of each of the recipients varies depending on characteristics of each of the campaign recipients, according to an embodiment. As previously described, for an embodiment, each recipient may be given a value. The value can indicate a level of influence that recipient has on other recipients, or the value can indicate a likelihood that other recipients will act similarly with the recipient. For an embodiment, the value indicates a likelihood that the recipient will engage when receiving the electronic mail campaign.

For an embodiment, the electronic message campaign adjusts or varies the display of the electronic message on the display of each recipient based at least in part on the characteristics of the recipient. Past history can suggest that recipients with specific characteristics will be more or less likely to engage depending upon the presentation (display) of the receive electronic messages of the electronic message campaign.

A display of a first electronic message 505 includes content that is adaptively selected based on characteristics of the recipient. A display of a second electronic message 507 includes movement of the electronic massage 508 across the display. A display of an Nth type of electronic message 509 includes the message popping up after a period of time. The electronic messages 505, 507, 509 of FIG. 5 are examples of the types of display manipulation of electronic messages of the electronic message campaigns based on characteristics of the recipient. These are non-limiting examples.

For an embodiment, the display of the electronic message campaign includes visual (content, presentation of display) based on prior engagements of the recipient. For example, a website link included within the message is influenced by prior actions/engagement of the recipient. The "look" and features of the campaign could be influenced by prior actions/engagement of the recipient.

For an embodiment, a recipient that has previously engaged with electronic message campaigns of a merchant will continue to receive electronic messages having similar displays because the display appears to be working. For an embodiment, a recipient that has previously refused to engage with electronic message campaigns of a merchant will receive electronic messages having varying displays in hopes that a different display will cause the recipient to engage with the campaign.

Although specific embodiments have been described and illustrated, the embodiments are not to be limited to the specific forms or arrangements of parts so described and illustrated. The described embodiments are to only be limited by the claims.

What is claimed:

1. A computer-implemented method of warming sending infrastructure for electronic message accounts, comprising:
   obtaining, by a server, an initial contact list;
   checking, by the server, the initial contact list to determine that the initial contact list satisfies an initial set of engagement rules;
   generating, by the server, an active contact list comprising modifying the initial contact list when the initial contact list does not satisfy the initial set of engagement rules;

electronically sending, by the server, an electronic message campaign to recipients of the active contact list;

analyzing a success of the electronically sent campaign, comprising sensing actions of the recipients in response to electronically receiving electronic messages of the electronic message campaign, wherein analyzing the success comprises:

a computing device of one or more of the recipients receiving an electronic message, an application loaded on the computing device controlling sensing of at least one sensor of the computing device based on reception of the electronic message;

the application loaded on the computing device identifying and tracking sensed actions of the computing device;

determining, by a campaign success engine, a success score of the electronic messages, and a level of engagement of the recipient based on the tracked sensed actions; and adaptively adjusting, by the server, the active contact list according to active engagement rules of based on an evaluated success of the electronically sent campaign comprising reducing a number of recipients of the active contact list by eliminating non-engaged recipients based on the determined success score of the electronic messages of the electronically sent campaign;

identifying engaged recipients of the electronic message campaign of the active contact list over a predetermined period of time by the active engagement rules;

adaptively adjusting the active contact list according to active engagement rules based on an evaluated success of the electronically sent campaign comprising adjusting the predetermined period of time based on the evaluated success of the electronically sent campaign;

electronically sending a present electronic message campaign to recipients of the adaptively adjusted active contact list; and controlling a visual content of displays of computing devices of each of the recipients of the present electronic message based on the level of engagement of the recipient.

2. The method of claim 1, wherein the application loaded on the computing device controls sensing of a location sensor and motion sensors of the computing device based on the reception of the electronic message, wherein the application loaded on the computing device identifies and tracks sensed locations of the location sensor of the computing device, and sensed motion of motion sensors of the computing device, and wherein determining the success score of the electronic messages, and the level of engagement of the recipient is based on the tracked locations, and the sensed motion.

3. The method of claim 1, further comprising:
determining, by the application loaded on the computing device, whether the computing device of the recipient interacts with another computing device of another recipient based on the sensed location and motion of the computing device, and sensed location and motion of another computing device of the other recipient; and
further controlling the visual content of displays of computing devices of each of the recipients of the present electronic message based on the determined influence of the recipient.

4. The method of claim 1, further comprising:
identifying patterns of location visits of the computing device of the recipient;

further determining, by the campaign success engine, the success score of the electronic messages, and the level of engagement of the recipient, based on the identified patterns of location visits.

5. The method of claim 1, further comprising sensing, by the application loaded on the computing device, web activity of the one or more recipients;
wherein the level of engagement of the recipient is further based on the sense web activity.

6. The method of claim 1, further comprising a plurality of predetermined periods of time, wherein qualification of whether a recipient is an engaged recipient is different for different of the predetermined periods of time.

7. The method of claim 1, further comprising:
sensing at least one of hand motions, direction of eyesight, and orientations of the computing device that indicate product interaction of the recipient; and
wherein the level of engagement of the recipient is further based on the indicated product interaction.

8. The method of claim 1, wherein the predetermined period of time increases when the evaluated success indicates the electronically sent campaign is determined to be successful, and wherein the predetermined period of time decreases when the evaluated success indicates the electronically sent campaign is determined to be unsuccessful.

9. The method of claim 1, wherein the active contact list adaptively updates as frequently as every time the electronic message campaign is electronically sent.

10. The method of claim 1, wherein checking the initial contact list to determine that the initial contact list satisfies the initial set of rules of engagement comprises:
determining whether a number of recipients of the initial contact list is greater than a first contact number threshold.

11. The method of claim 10, wherein generating the active contact list comprises modifying the initial contact list by reducing the number of recipients to below the first contact threshold.

12. The method of claim 1, wherein checking the initial contact list to determine that the initial contact list satisfies the initial set of rules of engagement comprises:
identifying a number of unengaged recipients of the initial contact list;
comparing the number of recipients of the initial contact list with a number of recipients of the initial contact list minus the unengaged recipients are removed from the initial contact list.

13. The method of claim 12, wherein generating the active contact list comprises:
eliminating the unengaged recipients if the compared number of recipients of the initial contact list with a number of recipients of the initial contact list minus the unengaged recipients is greater than a threshold percentage.

14. The method of claim 1, wherein analyzing the success of the campaign comprises determining an open rate of the campaign, including determining a percentage of recipients that opened the campaign.

15. The method of claim 1, wherein analyzing the success of the campaign comprises determining a click through rate of the campaign, including determining a percentage of recipients that selected a link within the campaign.

16. The method of claim 1, wherein analyzing the success of the campaign comprises determining a conversion rate of the campaign, including determining a percentage of recipients that are determined to have performed an action based on the campaign.

17. A system of warming electronic message accounts, comprising:
- a server electronically networked with a plurality of computing devices of a plurality of recipients of an electronic mail campaign, the server operating to:
- obtain an initial contact list;
- check the initial contact list to determine that the initial contact list satisfies an initial set of rules of engagement;
- generate an active contact list comprising modifying the initial contact list when the initial contact list does not satisfy the initial rules of engagement;
- electronically send an electronic message campaign to recipients of the active contact list:
- analyze a success of the electronically sent campaign, comprising sensing actions of the recipients in response to electronically receiving electronic messages of the electronic message campaign, wherein analyzing the success comprises:
  - a computing device of one or more of the recipients receiving an electronic message,
  - an application loaded on the computing device controlling sensing of at least one sensor of the computing device based on reception of the electronic message;
  - the application loaded on the computing device identifying and tracking sensed actions of the computing device;
  - determining a success score of the electronic messages, and a level of engagement of the recipient based on the tracked locations sensed actions; and
- adaptively adjust the active contact list according to active rules of engagement based on an evaluated success of the electronically sent campaign, comprising;
  - reducing a number of recipients of the active contact list by eliminating non-engaged recipients based on the determined success score of the electronic messages of the electronically sent campaign;
  - identifying engaged recipients of the electronic message campaign of the active contact list over a predetermined period of time by the active engagement rules;
  - adaptively adjusting the active contact list according to active engagement rules based on an evaluated success of the electronically sent campaign comprising adjusting the predetermined period of time based on the evaluated success of the electronically sent campaign;
- electronically send a present electronic message campaign to recipients of the adaptively adjusted active contact list; and
- control a visual content of displays of computing devices of each of the recipients of the present electronic message based on the level of engagement of the recipient.

18. The system of claim 17, wherein the application loaded on the computing device controls sensing of a location sensor and motion sensors of the computing device based on the reception of the electronic message, wherein the application loaded on the computing device identifies and tracks sensed locations of the location sensor of the computing device, and sensed motion of motion sensors of the computing device, and wherein determining the success score of the electronic messages, and the level of engagement of the recipient is based on the tracked locations, and the sensed motion.

19. The system of claim 17, wherein the application loaded on the computing device further determines whether the computing device of the recipient interacts with another computing device of another recipient based on the sensed location and motion of the computing device, and sensed location and motion of another computing device of the other recipient, and the server further operates to control the visual content of displays of computing devices of each of the recipients of the present electronic message based on the determined influence of the recipient.

20. The system of claim 17 wherein the application loaded on the computing device is further configured to sense at least one of hand motions, direction of eyesight, and orientations of the computing device that indicate product interaction of the recipient, and wherein the level of engagement of the recipient is further based on the indicated product interaction.

* * * * *